Oct. 20, 1925.
J. T. SIEFERT
1,557,729
ILLUMINATING MECHANISM
Filed June 5, 1924
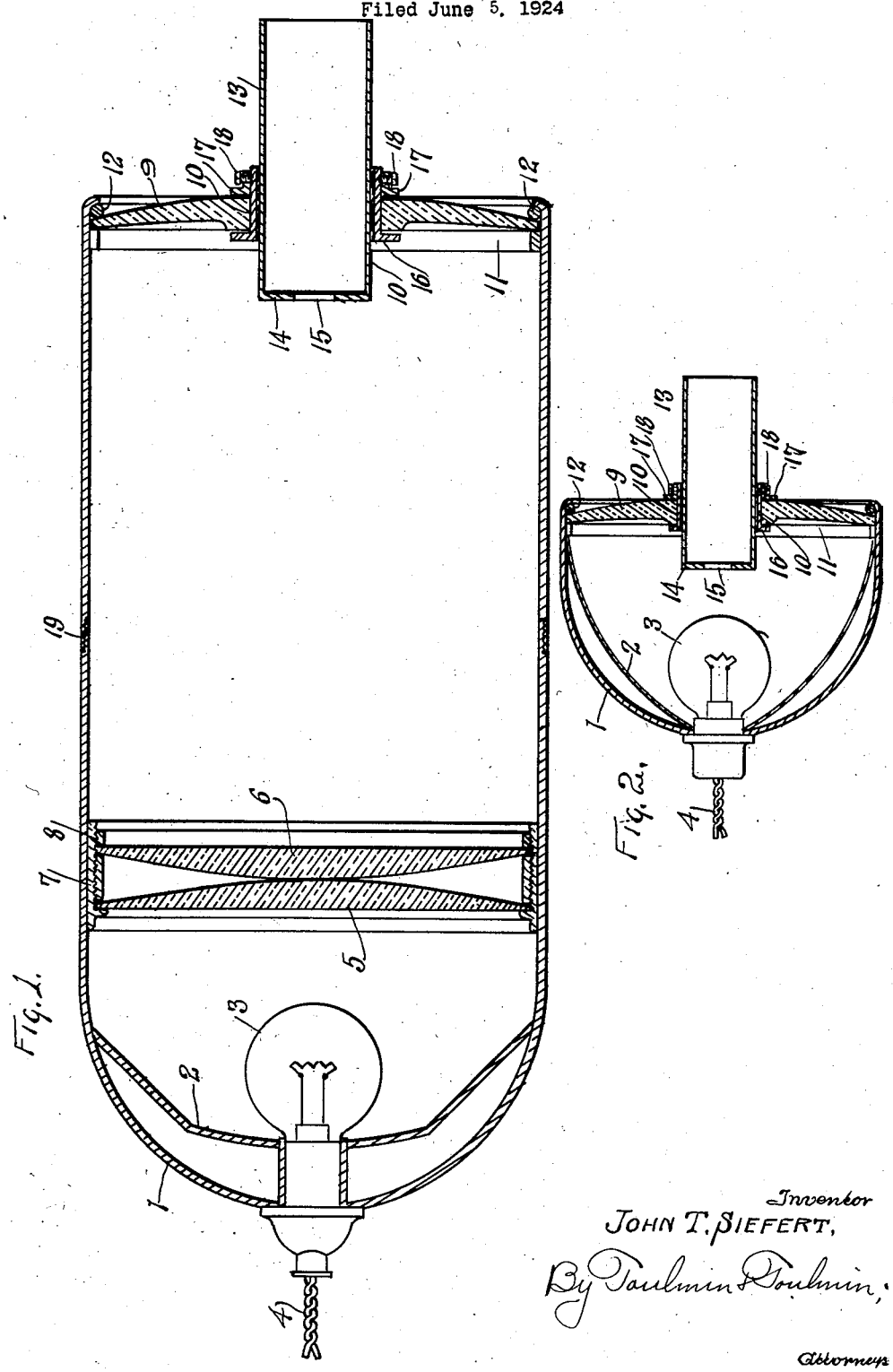
Inventor
JOHN T. SIEFERT,
By Toulmin & Toulmin,
Attorneys Patented Oct. 20, 1925.

1,557,729

UNITED STATES PATENT OFFICE.

JOHN T. SIEFERT, OF DAYTON, OHIO.

ILLUMINATING MECHANISM.

Application filed June 5, 1924. Serial No. 717,986.

*To all whom it may concern:*

Be it known that I, JOHN T. SEIFERT, a citizen of the United States, residing at Dayton, in the county of Montgomery and State of Ohio, have invented certain new and useful Improvements in Illuminating Mechanism, of which the following is a specification, reference being had therein to the accompanying drawing.

This invention relates to improvements in headlights and more particularly to a lens therefor which may be substituted for the lens in the ordinary headlight generally in use or may be embodied in a headlight particularly designed therefor.

The primary object of my invention is to provide a lens with one means to direct rays of light from the usual electric light bulb immediately in front of a vehicle for illuminating the roadway yet without the rays being directly visible by persons coming in the opposite direction and with another means by which the radiation within the lamp of the illumination from the rays will be intercepted and dimmed so as to illuminate and yet not cause a glare to affect on-comers.

To this end it is my object to provide a lens of translucent glass having an opening adapted to receive a tube to form a passageway with a barrier at or near one end having a restricted orifice, the lens to effect dimming without preventing passage of the illumination and the passageway to control the rays of light in the manner stated.

In the accompanying drawings: Figure 1 is a sectional view showing my improved lens construction applied to a special form of headlight;

Figure 2 is a similar sectional view showing the device applied to an ordinary headlight.

Referring to the drawings, 1 designates a casing for the headlight, 2 a reflector carried therein for reflecting the light from an electric lamp 3 which is supplied with current by a cable 4.

In Figure 1 the headlight is shown as provided with a plano-convex lens 5 and a similar plano-convex lens 6, which are held in position by retaining rings 7 and 8. These plano-convex lenses have their convex surfaces adjacent to one another, with the plane surfaces adjacent to the lamp and to the front of the mechanism. These lenses so positioned provide a condensing lens which concentrates the light and causes the rays to cross at a point at or near a restricted orifice in a passageway to be hereinafter referred to.

In this form of headlight the casing 1 is extended considerably beyond the lamp 3 and at the end thereof I have provided my improved lens having a translucent body 9 which will dim the rays of light passing therethrough so that they will not glare in the eyes of on-comers. This translucent body has an opening 10 in the center thereof and is mounted in a collar 11 and held in place by a spring ring 12. In the opening 10 I mount a tube 13 forming a passageway and having a barrier 14 at or near its inner end. This barrier has an orifice 15 therein which is relatively restricted and at or near which is the focus point of the concentrated or brilliant rays of light from the lamp 3 referred to above. These brilliant rays of light passing through the orifice into the tube 13 are projected in front of the automobile or other vehicle to illuminate the roadway and the tube serves to prevent the rays from being directly visible by the eyes of persons in an on-coming vehicle.

A collar 16 is interposed between the tube 13 and the lens 9 and a locking collar 17 serves to retain the parts firmly in position, said locking collar being held in place by a screw 18.

It will be understood that the casing may be made in two parts, and jointed as at the point 19 for convenience of assembling the device.

From the foregoing description the operation of the device will readily be understood. The light furnished by the lamp 3 being reflected by means of the reflector 2, passes through the lenses 5 and 6 which are adapted to converge the rays of light to a point at or near the orifice 15. These converged or brilliant rays will then pass through said orifice into the tube or passageway 13 and project in front of the vehicle to illuminate the roadway, the tube preventing the vision of on-comers from being interferred with. In addition to this brilliant light there will be the rays of light passing through the lens 9, which rays however will not glare in the eyes of on-comers by reason of the character of such lens. These rays of light add a soft glow around the brilliant rays projected from the tube 13.

Figure 2 shows my invention applied to an ordinary headlight, in which my improved lens construction takes the place of the usual lens. The above description of mounting the lens 9 in the extended casing 1 will apply equally to mounting it in the casing of the ordinary headlight and the same reference numerals have been applied to corresponding parts. In this form some direct rays of light from the lamp 3 pass through the tube 13, and afford some bright light to illuminate the roadway for the driver, while the translucent lens 9 will prevent any glare in the eyes of on-comers.

Having thus fully described my invention, what I claim as new and desire to secure by Letters Patent, is:—

1. In a headlight, the combination with a casing, an electric light bulb near one end thereof, and a reflector, of a translucent disk located near the other end of said casing and having an opening therein, and a tube adapted to occupy such opening and provided at or near its inner end with a restricted orifice through which the rays of light pass and at or near which they cross; the said disk serving to dim the light and said tube to cut off the direct rays from the vision of an on-comer.

2. In a headlight, the combination with a casing, an electric light bulb near one end thereof, and a reflector, and plano-convex lenses mounted in said casing near said electric light bulb, of a translucent disk located near the other end of said casing and having an opening and provided at or near its inner end with a restricted orifice through which the rays of light pass and at or near which they cross, the said disk serving to dim the light and said tube to cut off the direct rays from the vision of an on-comer.

In testimony whereof, I affix my signature.

JOHN T. SIEFERT.